Jan. 13, 1959 J. E. VISTAIN, JR 2,868,547

AUTOMATIC RECORD PLAYER MECHANISM

Filed June 1, 1953 2 Sheets-Sheet 1

INVENTOR.
James E. Vistain Jr.
BY
J. W. Douglas
Att'y

Jan. 13, 1959 J. E. VISTAIN, JR 2,868,547
AUTOMATIC RECORD PLAYER MECHANISM
Filed June 1, 1953 2 Sheets-Sheet 2

INVENTOR.
James E. Vistain Jr.
BY
J. D. Douglas
Atty.

2,868,547
Patented Jan. 13, 1959

2,868,547

AUTOMATIC RECORD PLAYER MECHANISM

James E. Vistain, Jr., Skokie, Ill., assignor to Admiral Corporation, Chicago, Ill., a corporation of Delaware Application June 1, 1953, Serial No. 358,827
10 Claims. (Cl. 274—15)

This invention relates to improvements in phonograph record players for reproducing a stack of records wherein the records of different diameters may be intermixed. The records may be supported in any order relative to each other directly above a horizontal turntable upon a spindle at the axis thereof. The spindle extends through the center holes of the records and serves as a guide for guiding the records into a centered position on the turntable when they are released in one-by-one order from the spindle. More specifically, the invention comprehends controls for automatically limiting the inward swing of a pickup arm in accordance with the size of record released to the turntable during a cycle of its motion, to a point over the beginning of the record so that the same may be operatively engaged by said arm.

Among the improvements incorporated in the present invention are those which provide for ease of operation of the mechanism, convenience of repair or adjustment and economy in manufacture.

Other advantages of the invention will be set forth in part hereinafter and in part will be obvious herefrom, or may be learned by practice with the invention, the same being realized and attained by means of the instrumentalities and combinations pointed out in the appended claims.

Figure 1:
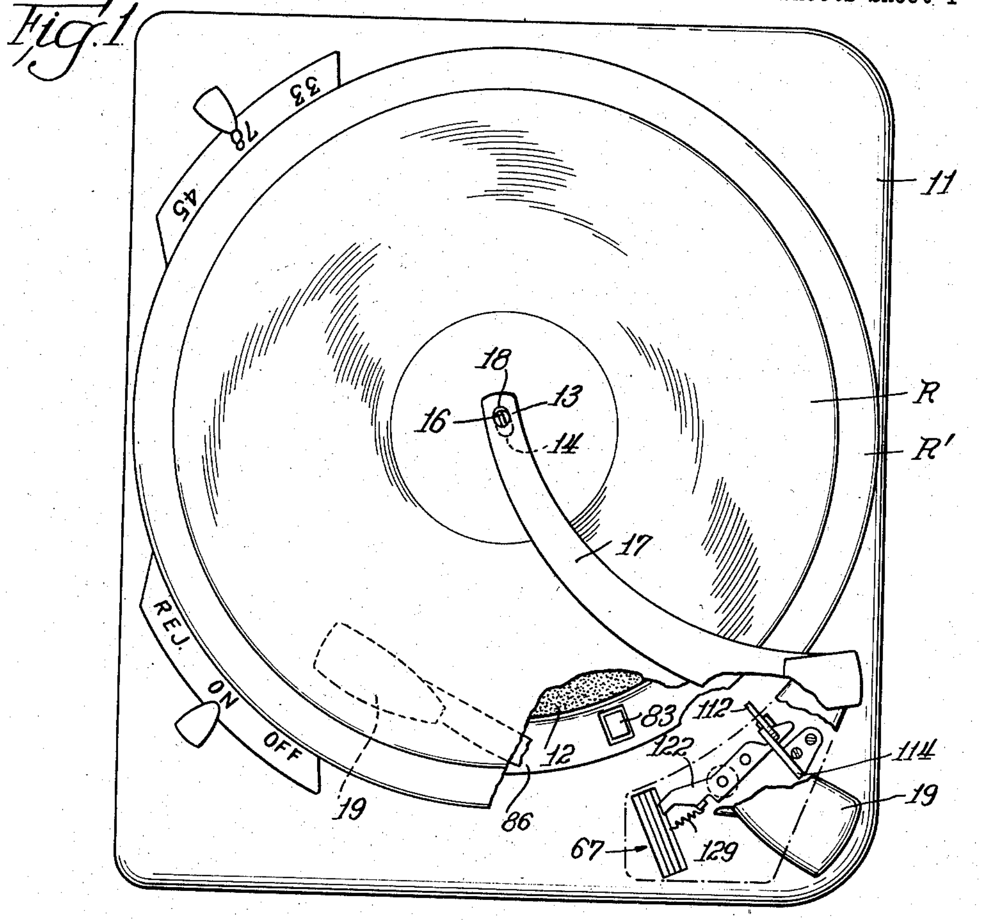
Fig. 1 is a top plan view of a record player in combination with which the invention is incorporated, parts being broken away to disclose other parts.

While the present invention is capable of being used in combination with record players provided having magazines of other types for support of a stack of records above the level of a turntable, it is herein disclosed in connection with a record player in which the stack of records is supported only by the shoulder of a spindle at the axis of the turntable such as is disclosed in my copending application filed November 8, 1951, Ser. No. 255,344. Therefore, only adequate mechanism to afford a setting for the novel feature of this machine will be indicated. Details of this record player, shown in Fig. 1, include a base 11 for support of a turntable 12 at the axis of which is a spindle 13, which has a shoulder 14 toward its upper end on which a stack of records R and R′ rest while their center holes are threaded over a pilot portion 16, of the spindle, offset relative to the axis of the turntable. The records are restrained from tipping about the shoulder 14 by a keeper mechanism 17, also supported from the base 11. The keeper is movable longitudinally of its vertical axis and rotatable thereabout so that it may be extended over the stack for engagement with the top record thereof. During its engagement, the pilot portion 16 extends through an aperture 18 in the end of the keeper. The base 11 also indirectly affords support for a pickup arm 19 which is hinged for motion about horizontal and vertical axes.

In order to understand the invention and its functions it is advisable that the suspension of the pickup arm be first considered. It includes (Fig. 5) a bushing 21 supported from the base 11 by a plastic pedestal 22 and in turn affords support for a tubular shaft 23 journalled therein. The shaft 23 is restrained against axial displacement upward by engagement of a flange 24, on shaft 23, with the base plate 11. Axial displacement of the shaft 23 downward is resisted by a compression spring 26 confined between the base plate 11 and a C-washer 27 pinched about the shaft 23 in an annular groove 28. The shaft 23, in turn, affords bearing support for a second tubular shaft 29 telescoped therein which is restrained from axial motion downward by a collar 31 adjustably secured on the shaft and normally in engagement with the pedestal 22. While a vertical axis for the pickup arm 19 is provided by the shaft 29, a horizontal axis therefor is also provided by a pin 33 pivotally coupling a pair of spaced apart arms 32 on the collar 31, to corresponding arms 34 extending downward from the tone arm. Additional features of the connection between the tone arm and its support are described in my copending application, Ser. No. 55,801, filed October 21, 1948. The pickup arm 19 is adapted to be tilted or rocked vertically about the rod 33 by vertical motion of a lift pin 38, slidably journalled in the tubular shaft 29.

Figures 4, 5, 6, 7:
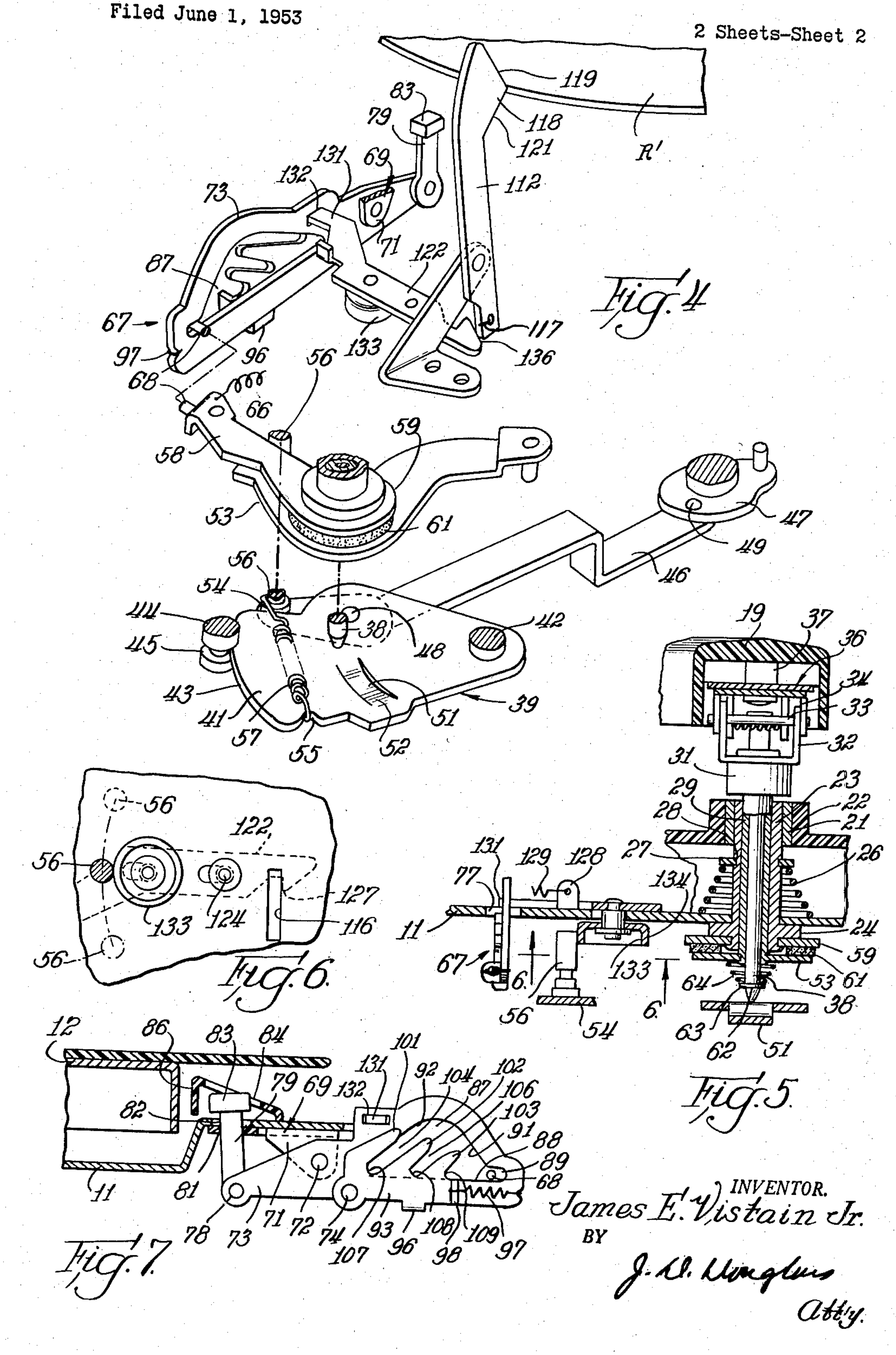
Fig. 4 is an exploded perspective view of mechanism for controlling the pickup arm.
Fig. 5 is a fragmentary vertical section taken on line 5—5 of Fig. 2.
Fig. 6 is a fragmentary horizontal section indicated by line 6—6 of Fig. 5.
Fig. 7 is a fragmentary vertical section indicated by line 7—7 of Fig. 2.

The lift pin 38 is raised by a swing-out mechanism indicated in its entirety by the reference character 39 (Fig. 4). It comprises a cam plate 41 which is pivotally supported on a post 42, carried by the base plate 11. A curved edge 43 of the plate, concentric with the post 42, is disposed in a groove 45 on a guide stud or stop 44, carried by the base plate 11 so that as the plate 41 is moved, support for the outermost portion of the plate is provided and resists binding of the plate on post 42. The alignment of the pivot 42, lift pin 38, and the stud 44 is such as to resist tilting of the plate by the pin 38. The plate 41 is also coupled to a crank plate 47 by a link 46, a first pivot pin 48 connecting the link to the cam plate 41 and a second pivot pin 49 connecting the link to the crank plate so that rotary motion of the crank plate is translated into swinging motion of the plate 41. The crank 47 is rotated one revolution for each record changing cycle. It is automatically stopped once it has completed a revolution. This crank is connected to cyclically operated mechanism not shown, the operation of which is initiated by the runout groove of a record, and is discontinued automatically with termination of the record changing cycle as illustrated in said copending application.

The weight of the pickup arm is, of course, partly supported by the record it is tracking. During this process, the lift pin 38 is free of the weight of the pickup arm since said pin rests against a dwell portion 51 of a vertically effective cam 52 on the plate 41. As plate 41 is swung outward at the beginning of its cyclic motion, however, the cam 52 is carried under the lift pin to move it upward. The upward movement of pin 38 is adequate for engagement and support of the pickup arm which is thereby supported in elevated relation to the turntable, or the accumulation of records thereon, until cyclic motion of the plate 41 enables the lift pin to be restored to its record playing position on completion of a cycle.

In order to understand the means by which the pickup arm is moved outward, once it is supported by the lift pin 38, it should be noted that the pickup arm supported shaft 29 carries an arm 53 at its lower end. The arm 53 is rigidly fixed to shaft 29 and consequently is swingable laterally with the pickup arm. Also, it should be noted that the pivot pin 48, which connects the link 46 to the cam plate 41, also affords a pivot for connecting a contactor arm 54 to the plate 41. On its swingable end, the arm 54 carries a contactor pin or striker pin or follower 56 which is held in engagement with the edge of the plate 41 by a spring 57, one end of which is hooked around the pin 56 and the other end of which is hooked in a notch 55 on the edge of said plate remote from the contactor. As the contactor is carried in an outward direction, that is, counterclockwise about the post 42 (Fig. 4), it engages the arm 53 and carries said arm before it to concurrently swing the pickup arm outward, that is also counterclockwise, engagement of the pin 56 being with the arm at the edge thereof farthest from the observer.

Due to the manner in which the contactor arm 54 cooperates with the plate 41, the pickup arm 19 is yieldably swung outward during a record playing cycle, as a safety measure.

Associated with the operating arm 53 is means for regulating the set-down position of the pickup arm 19. Said means includes a pickup positioning arm or set-down lever 58 which is carried on the reduced end of the tubular shaft 23 being staked to the end thereof. The set down lever includes a disc port 59 around the shaft to which a washer 61 of some suitable friction material such as cork is secured as by an adhesive. Adjacent its lower end, the lift pin 38 is provided with an annular flange 63 to confine between it and the operating arm 53 a compression spring 64 which is coiled about the lift pin 38.

When the lift pin 38 is in engagement with the dwell portion 51 of the cam plate (pickup arm lowered), the spring 64, although intimately associated with the arm 53, is not in such a preloaded state as to support the pickup arm, there being a slight clearance of approximately 1/32" between the arm 53 and the washer 61. This enables the arm 53 and the pickup arm to swing freely while the pickup arm is tracking a record; as previously indicated when the lift pin 38 is moved upward in the course of a cycle, its motion is conveyed to the arm 53 through the spring 38, and the arm 53 is moved upward into pressure engagement with the friction washer 61. This limited clutch relationship between the member 53 and disc 59, when the lift pin is in elevated position, is responsible for movement of the positioning arm 58 outward or in a counterclockwise direction to the position indicated in Fig. 4. This motion of the positioning arm is against the resistance of a tension spring 66 anchored to said arm connected to the base. The arm 53 and the positioning arm are adapted to be swung into engagement with the stud 44 in order that a preset or predetermined angular relationship may be established between the arm 53 and arm 58, the means for automatically selecting the let-down points being described hereinafter.

Due to the clutch mechanism, by which the arm 53 is coupled to the positioning arm 58 for angular movement therewith, it is possible, when the pickup arm is in cycle, to grasp said pickup arm and move it angularly within limits without breakage or permanent deformation of any of the parts, since friction between arm 53 and the positioning arm 58 is insufficient to positively resist the arbitrary movement of the pickup arm. This safety feature, besides the safety feature previously indicated, do not, however, interfere with the aligning function of the stud 44 if the normal horizontal swinging motion of the pickup arm is arbitrarily interfered with.

Inward motion of the arm 58, and hence the arm 53 and its associated pickup arm from the stud 44, is limited by a selector mechanism 67, Fig. 7. It, in turn, is subject to adjustment by the size of record on turntable 11 to vary the limit of the inward swing of arm 58, and consequently inward motion of the pickup arm. The limiting operation of the mechanism 67 is effective until the lift pin 38 is lowered whereupon the pickup arm is freed for tracking owing to disengagement of the clutch between the arms 53 and 58.

The positioning arm 58 carries a finger 68 which cooperates with the selector mechanism 67. The selector mechanism 67 includes a bracket 69, rigidly attached to the base plate, and has an arm 71 extending normal to the plane through which finger 68 is carried. A selector lever 73 is pivoted to the arm 71 at 72, for operation in a vertical plane. The base plate 11 is apertured at 77, Fig. 2, as a means of clearance for the selector mechanism 67. A detector link or vertically movable member 79 is pivoted at 78 to one end of the selector lever 73 and is guided in a substantially vertical direction by a slot 81, in the bracket 69; said member 79 also passes freely through an aperture 82 in the base plate 11 and carries at its upper end a pad 83 adapted to move freely through an aperture 84 in an escutcheon 86 which is disposed about the periphery of the turntable 12. The selector lever 73 to the right of shaft 72, is of increased width in a vertical direction and has a clearance opening 87 of generally triangular formation within which the finger 68 may move laterally. A lower edge 88 of the aperture 87 is straight to a clearance notch 89 which is only wide enough to accommodate the finger 68. From the notch 89 a curved cam edge 91 extends to an edge 92 which extends obliquely from the edge 88 to further define the contour of opening 87. The aperture 87 is partly covered on one side thereof by a toothed interceptor member 93 which is pivoted at 74 to the lever 73. Motion of the toothed member 93 in one direction is limited by a lug 96 which extends laterally under the lever 73. Movement in the downward direction is limited by a spring 97 that maintains engagement between the lug 96 and lever 73. The spring is anchored to the lever 73 and an ear 98, on the member 93. The center of gravity of the combined lever 73 and member 93 is to the right of the stub shaft 72 (Fig. 7) so that said lever and cam are normally biased by gravity clockwise about the pivot 72.

When the arm 58 is in engagement with the stud 44, the finger 68 is at the notch 89, said finger then supporting the lever 73 against rotation clockwise. When, however, the arm 58 starts its inward movement, the finger 68 is, of course, carried away from the notch 89 consequent to which operation the selector mechanism is enabled to rock clockwise by its own weight to an extent permitted by the finger 68 as it is moved to the left (Fig. 7) in engagement with the cam edge 91. The swinging of the lever by gravity causes the pad 83 to be elevated. If the turntable 12 is bearing a 10-inch record, which extends beyond the periphery of the turntable, the weight of this record overcomes the movement of the pad 83 to an elevation above the level of the turntable.

The upward movement of the pad 83 may be limited to the same extent by both 10- and 12-inch records. The movement of the pad 83 falls short of the plane of the turntable top, however, following release of a 12-inch record to the turntable, this limitation is effected by other and novel means, later to be described. An angular position differing from the position permitted by the 10-inch record, regardless of whether or not other records smaller than the 12-inch record are between it and the turntable during a record changing cycle is thus provided. Consequent to release of 7-inch records only to the turntable, no obstruction is offered to vertical movement of the reach pad 83 so that it is enabled to reach a level above the top of the turntable. First, second and third positions are therefore provided for the lever 73 which determines the set-down point of the pickup arm for 7-inch, 10-inch and 12-inch records. These positions determine the ultimate position assumed by the finger 68 following its disengagement from the cam surface 91 when the arm 58 is rotated clockwise as viewed in Fig. 4.

The interceptor member 93 includes a series of teeth of fingers 101, 102 and 103 slanting upward and to the right (Fig. 7) from the base of said member thereby providing slots 104 and 106 slanting upward from sockets 107, 108 and 109 at the edge 88 of lever 73. The finger 68 is adapted to be moved out of engagement with the cam surface 91 at a different point along said cam surface as the finger is carried inward, it being understood that the inward movement of the finger is due to the clockwise movement of the arm 58. When the finger 68 leaves the edge 91, as when the selector mechanism 67 is in its first position, it engages the tooth 103 and enters the socket 109. The selector mechanism is rotated slightly upward or counterclockwise in the course of this operation due to the curved formation of the edge of the tooth 103. This lowers the pad 83 and affords clearance between the pad and a record during its reproduction. When finger 68 has reached the socket 109, the arm 58 is unable to move farther, and the angular movement of the pickup arm inward toward the center of the turntable is arrested over the beginning of the sound groove of the 12-inch record. The pickup arm remains in this position until the end of the record change cycle when downward movement of the lift pin 38 interrupts the frictional coupling between arm 53 and the set-down arm 58 so that when the pickup arm is lowered into engagement with the 12-inch record, it is freed for tracking the same.

To understand how the selector mechanism arrests the finger 68 in a second position, it should be noted that the finger leaves the cam surface 91 at a later point during a cycle than in the operation just described. It will also be noted that the tooth 102 is sufficiently longer than tooth 103 to intercept the finger 68 during its movement to the left when plate 73 is tilted further clockwise. In a manner similar to the operation just described, the pad 83 is then retracted from the 10-inch record by cooperation between the finger 68 and the tooth 102, thus rotating the selector mechanism 67 counterclockwise. The finger 68 coming to rest in engagement with socket 108, the inward motion of the pickup arm is arrested over the beginning of the sound groove of the 10-inch record, engagement of the pickup arm therewith being effected after the lift pin 38 is lowered.

When the selector mechanism 67 is enabled to rotate to the extent permitted by a 7-inch record, the entire edge 91 is engaged by the finger 68 as it is carried inward. Then since it is continuous from the edge 91, the edge 92 has cam relationship with the follower 68 over which the edge climbs, as said follower is carried inward, the operation being accompanied by rocking of the selector mechanism 67, clockwise about pin 72. Also, the follower 68 is conveyed along the finger 101 to the socket 107 at the base of said finger. Engagement of the follower with the socket 107 is maintained until another change cycle is initiated. In the meantime, the arm 53 is freed from the arm 58 so that the pickup arm may perform its tracking operation on the 7-inch record, after the lift pin 38 moves downward.

As already indicated, the interceptor member 93 is biased counterclockwise (Fig. 7) about its pivot 74. This structural feature, rather than incorporation of the fingers 101, 102 and 103 as integral parts of, or parts rigidly secured to the plate 73 has been adopted for the sake of safety. As it happens, it would be quite possible for an operator of the record player to replace a 7-inch record, on the turntable, by a group of larger records of the 12-inch variety before the follower 68 has had time to be carried out from between the fingers 101 and 102. In this event, the 12-inch records would obstruct the selector mechanism's upward motion. In this event, weight of the 12-inch records would obstruct motion of the pad 83 and the finger 102 would obstruct passage of the follower 68 outward in the course of a cycle. The plate 93 being movable, as described, it would be moved against resistance of the spring 97 on cam engagement of the follower 68 with the finger 102 as a manner of freeing the follower.

A brief resume of the operation is now in order.

On initiation of a cycle, the first movement of the cam plate 41 causes the cam 51 to raise the lift pin 38 which in turn raises the tone arm. The pin also, through the spring 64, raises the arm 53 which may be called the pickup arm control lever, causing frictional engagement between it and the positioning arm 58 which may be designated as the pickup arm positioning lever.

As the cam plate 41 swings, the pin 56 engages the control arm 53. Because the two members are now frictionally engaged, this movement is also communicated to the position arm 58, the two members rotating in unison. The rotation of the arm 58 is, however, against the pressure exerted by the spring 66. The movement of the levers also swings the pickup arm out beyond the periphery of the largest record.

It will be appreciated that the arms 53 and 58, although rotating together, may not always be in the same position of rotation to each other at the time they are brought into frictional engagement. On the other hand, it is desirable at some point in the cycle to have them attain a definite predetermined rotated position relative to each other because the arm 58, which operates only when the clutch is engaged, is the one that determines the position to which the pickup arm is returned and holds it in the proper position so that it may be lowered into engagement with the starting sound groove of the record. This is effected by causing both of the arms 58 and 53 to engage with the support stud 44. This can best be seen in Fig. 4 where the pin 56 which is resiliently carried by the cam is pressing against the shorter arm of the lever 53 as well as the arm 58 and since they may slide relative to each other, they are both aligned by the pressure against the stud 44.

At this point the advantage of the pin 56 being resiliently carried by the cam plate becomes more apparent because, when the arms 58 and 53 engage the stop stud the pin 56 merely stops moving. The cam plate can continue in its counterclockwise movement because the spring 57 stretches.

Inasmuch as the pickup arm is now to one side of the records (both on the turntable and the stack) it is now possible for a record to be discharged from the stack onto the turntable.

The two smaller sizes of records on the turntable and the largest sized record, while it is being transferred to the turntable, eventually determines the position to which the pickup arm is returned, it being returned, its maximum distance for a 7-inch record, a lesser distance for a 10-inch record and the least distance for a 12-inch record. It should be pointed out that, as shown, the mechanism is only able to play mixed 10-inch and 12-records, although the device will also reproduce stacks of 7-, 10- or 12-inch records.

The crank plate 47 has now rotated more than 180 degrees, and the record having been ejected from the stack onto the turntable, it now starts to pull the cam plate back toward its original position. Although both the pickup arm control 53 and positioning arm 58 were pushed out by the pin 56 on the cam plate, the rotation of these arms in the opposite direction is effected only by the spring 66 which holds the arms against the pin 56 as the cam plate is pulled back toward its original position. During the backward or clockwise movement of the arms as viewed in Fig. 4, the finger 68 on the arm 58 is withdrawn from the notch 89 of the selector and the selector moves by gravity about its pivot. The arm 79 moves upward and its engagement or non-engagement with a record determines the position it assumes during the first part of the movement of the arms 53 and 58.

The two arms then rotate inward or clockwise until the finger 68 engages one of the teeth 101, 102 or 103 and then moves into one of the notches 107, 108 or 109. On its passage into the notch, the cam shape of the teeth causes the selector to be rocked slightly to bring the arm link 79 down sufficiently far that the record engaging portion is withdrawn from engagement with the record. Since the elements 58 and 53 are still frictionally engaged, the pickup arm is rotated to the proper position over the starting groove of the record. At this time, the finger 68 bottoms in the notch and movement of the two levers and the pickup arm ceases. The pin 56 moves away from the sides of the two levers and they remain stationary.

The cam plate continues in its movement back to its original position. Eventually, the lift rod 38 rides downward on the dwell 51. This lowers the pickup arm with its needle onto the record and also at the same time lowers the shaft 29 that swingably supports the pickup arm, withdrawing the control lever 53 from frictional or clutching engagement with the arm or position lever 58. The pickup arm and its support is now free to track a record and reproduce the vibrations recorded thereon.

Figure 2:
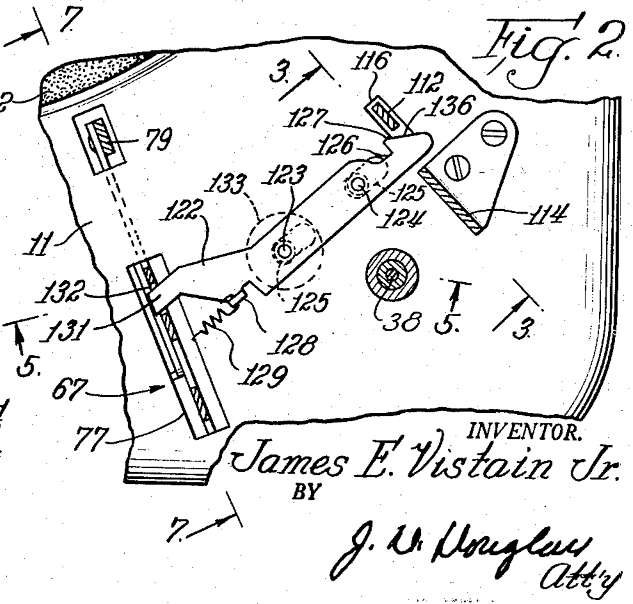
Fig. 2 is a fragmentary view of parts shown in Fig. 1, the same being drawn to an enlarged scale, and some of which are in different positions than those in Fig. 1.
Figure 3:
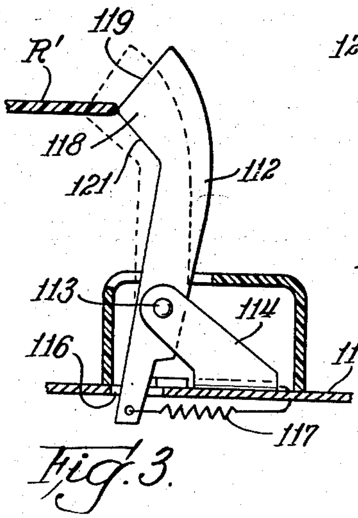
Fig. 3 is a vertical section indicated by line 3—3 of Fig. 2.

Although the description, up to this point, has been of mechanism by which stacks consisting of 7-inch and 10-inch records may be severally reproduced automatically, novel mechanism in combination with the foregoing mechanism and by which the capacity of said foregoing mechanism is expanded so that it may automatically reproduce a stack of intermixed 10- and 12-inch records will now be described. It is best shown in Figs. 1 to 3 inclusive and comprises a first latch member or trigger lever 112 pivoted at 113 to a bracket 114 on the base 11. The bracket 114 is of L-shaped vertical section and is offset as indicated, so that the lever 112 is supported over an aperture 116 in the base 11, through which the lever extends. Additionally, for a reason later to become apparent, the bracket 114 is so positioned on the base plate that lever 112 is swingable in a vertical plane which is radial of the turntable's axis. A tension spring 117 is anchored to the end of the lever 112 to bias it into its normal position as indicated by the broken lines (Fig. 3). At this time, a portion 118 of the lever 112 extends into the course of a 12-inch record R′; that is, the course through which said record is guided downward to the turntable 12, by the spindle, when dislodged from the support of the shoulder thereon. As will be noted, that portion of the part 118 which normally extends into the course of the record R′ is of wedge shaped formation since it is defined by an upper or cam surface 119 and a lower or removal cam surface 121. Both of the surfaces converge toward the spindle 13. The cam 119 is engaged and displaced, against the force of spring 117, by a 12-inch record while said record is moving downward toward the turntable, the lever 112 being thus swung to its full line position. The surface 121 is engaged by 12-inch records, when they are removed from the turntable, to swing the lever sufficiently against spring 117 for lifting the records therepast.

In response to operation of the lever 112 by a 12-inch record, a second latch member or retainer link 122 is operated. Its purpose is to lock the selector mechanism 67 against tilting until after the notch 109 thereon is engaged by the finger 68. The link 122 is carried by the base 11 between the selector 67 and lever 112. It is slidably secured to the base by a pair of studs 123 and 124 thereon, extending downward through a pair of guide slots 125, in the base, wherein the studs are anchored by means, later to be described. Furthermore, the slots are arranged on a line normal to the plane of operation of lever 112. The link 122 is thus movable in a longitudinal manner, within limits. When it is disengaged from the lever 112, the link 122 is drawn to one of these limits by a spring 129 anchored to an ear 128 struck upward from said link at a point thereon in line with the studs 123 and 124. Adjacent the lever 112, the link 122 is notched at 126 thereby providing a hook 127. Normally; that is, between record changing cycles and when records smaller than a 12-inch record are released to the turntable, the hook 127 is in hooked engagement with the lever 112 (Fig. 1), a status which is augmented by the springs 129 and 117, the link 122 acting as a stop to resist counterclockwise rotation of the lever 112, engaging the bottom of notch 126. The remaining end of the link 122 is in offset relation to the plane of pins 123 and 124 for clearance of the spring 129 and terminates in a finger 131 adapted to be received in an aperture 132 in the selector lever 73 when the lever 112 is unhooked from the link 122, an operation which is performed, of course, by a 12-inch record passing over cam 119.

Sequentially, in the course of the same cycle in which the second latch member 122 is released, said member is returned to its normal position of hooked relationship to the lever 112, as described. Means by which this is accomplished comprises a thimble or disc 133 journalled on the pin 123, below the base plate. The disc 133 is formed with a depending flange or cam 134 at its periphery which extends downward adequately to be in the horizontal plane of the striker pin 56. The flange 134 is out of the course of the striker, except when the second latch member is unhooked from the first latch member and this occurs approximately at the middle of a cycle or shortly thereafter when the pin 56 has been carried to its outermost position. The axis of the thimble is never displaced as far as the course through which the axis of the pin is carried although the periphery of said thimble crosses the course of the pin axis when the second latch member 122 is disengaged from the first latch member 112. Consequently, when the pin is on its return movement during the second half of a cycle, it performs the function of a follower while the flange 134 acts as a cam. The ensuing cooperation between follower 56 and cam 134 causes the latter to be displaced toward its normal position against the resistance of the spring 129 to restore latched engagement between the members 112 and 122. For this to be effected, one of the edges of member 122, between the notch 126 and extremity of said member, is defined by another cam surface 136, extending obliquely of the link, which engages the lever 112 and rocks it in a clockwise direction (Fig. 3) as the link 122 is moved toward its latched position. When the link 122 is thus moved far enough, the lever 112 snaps into the notch 126 thereby restoring said lever to its normal or latched position. Thereafter a continuation of the movement of link 122 is but slight before its direction is reversed and said link is then restored to hooked engagement with the lever 112.

Although the invention has been described in one embodiment thereof, I am aware that numerous and extensive departures may be made therefrom without departing from the spirit or scope of my invention.

I claim:

1. An apparatus for controlling the let-down position of a pickup arm of a record player for enabling the playing of intermixed sizes of records including means for controlling the let-down position of the pickup arm for a record of one size comprising a pickup arm control means connected to the pickup arm, a member disposed to engage with a record on the turntable and operably connected to the pickup arm to control its let-down position, a lever disposed beside the turntable and positioned to be engaged and moved by a larger sized record, in its path toward the turntable, and means controlled by said lever for engaging said pickup arm control means to hold it in position for controlling the pickup arm let-down position for records of a larger size.

2. An apparatus for controlling the let-down position of a pickup arm of a record player for enabling the playing of intermixed sizes of records including means for controlling the let-down position of the pickup arm for a record of one size comprising a pickup arm control means connected to the pickup arm, a member disposed to engage the underside of a record on the turntable and to be positioned thereby and means operably connected thereto and to the pickup arm, to control its let-down position, a lever disposed beside the turntable and positioned to be engaged and moved by a larger sized record in its path toward the turntable and latch means arranged to be released by said lever and having means engaging said pickup arm control means to hold it in a fixed position for controlling the pickup arm let-down position for records of a larger size, and means for resetting said latch means after its release during a cycle of operation.

3. An apparatus for controlling the let-down position of a pickup arm of a record player for enabling the playing of intermixed sizes of records including means for controlling the let-down position of the pickup arm for positioning it at the start of a record of one size, comprising, a member engageable with a record on the turntable, and a connecting member connecting said member to the pickup arm to control said pickup arm, and means extending into the path of travel of a larger record falling onto said turntable and movable by said record upon its falling to the turntable, and, a second means controlled by said last mentioned means and engageable with said connecting member to hold said member against movement and position said member for the playing of larger sized records.

4. An apparatus for controlling the let-down position of a pickup arm of a record player for enabling the playing of intermixed sizes of records including means for controlling the let-down position of the pickup arm for playing a record of one size comprising a member engageable with the underside of a record on the turntable and control means positioned by said member and arranged to engage the pickup arm and position it for engagement with the start of record grooves of different sizes and means extending into the path of travel of a larger record falling onto said turntable and movable by said record upon its falling to the turntable, a spring biased latch having a portion for holding engagement with said last means to hold said latch in a predetermined position against the tension of said spring, and said latch being released by said means by removal of said portion of said means from the latch upon the falling of a record, said last means having a portion for engagement with said member positioned by the first means to hold said member against movement and position said member for controlling said pickup arm to engage the entering groove for the playing of larger sized records.

5. A record player wherein the records are supported on a spindle and are released from the spindle to drop onto a turntable and cyclicly operated means is provided to raise a tone arm, swing it outwardly and return it to playing position in timed relation to the release of the record, a movable selector arranged to control the return position of the tone arm, means for determining the position of the selector for a record of a predetermined size comprising a lever positioned to one side of the turntable in the path of a falling record of a predetermined size and arranged to be swung by the record when it falls onto the turntable, a latch, spring means for urging said latch into engagement with the selector, and means on said latch arranged for interlocking engagement with the selector, said lever being arranged for engagement with the latch to hold it away from the selector in the absence of its release by a record.

6. A record player wherein the records are supported on a spindle and are released from the spindle to drop onto a turntable and cyclicly operated means is provided to raise a tone arm, swing it outwardly and return it to playing position in timed relation to the release of the record, a movable selector for controlling the return position of the tone arm, means for determining the position of the selector for a record of a predetermined size comprising a lever pivotally supported at one side of the turntable and having a cam portion disposed in the path of a falling record of a predetermined size and arranged to be swung by the record when it falls onto the turntable, a latch disposed between the lever and the selector, spring means for urging said latch into engagement with the selector, and means on said latch arranged for interlocking engagement with the selector, said lever being arranged for engagement with the latch to hold it away from the selector in the absence of its release by a record.

7. An apparatus for use with a record player wherein a plurality of records of different sizes may be supported above a turntable and released singly to be deposited on the turntable and means is provided for cyclicly controlling a tone arm to raise it from over the turntable, swing it outwardly beyond the path of the records and return it into playing position over the starting groove of a record and a movable selector for controlling the return of the tone arm to record playing position said selector having a plurality of portions positioned for arresting engagement with the tone arm control means, said selector position being controlled by size of the record to be played and the arresting engagement which is determined by the angular position of the selector, comprising means for controlling the angular position of the selector including a lever pivotally supported to one side of the turntable and having a portion disposed in the path of a 12" record when it is released to the turntable and arranged to be moved about its pivot by contact with the falling record, a latch, resilient means for moving said latch into locking engagement with the selector to hold it in a predetermined position, said latch having a part arranged for locking engagement with said lever for holding the latch away from the selector and arranged to be released by the lever when the lever is operated by a record.

8. A device as described in claim 7, wherein a cam is provided on the latch and said cyclicly operated mechanism is arranged to engage said cam and cyclicly move said latch into locking engagement with the lever.

9. An apparatus for use with a record player wherein a plurality of records of different sizes may be supported above a turntable and may be released singly to be deposited on the turntable and means is provided for cyclicly controlling a tone arm to raise it from over the record on the turntable, swinging it outwardly beyond the path of a record to be dropped onto the turntable and return it into playing position over the starting groove of a record and a movable selector for controlling the return of the tone arm to record playing position said selector having a plurality of positions arranged for arresting the tone arm control means, said selector position being controlled by size of the record to be played and the arresting engagement of which is determined by the angular position of the selector, comprising means for controlling the angular position of the selector including a lever pivotally supported to one side of the turntable and having a cam portion disposed in the path of a 12" record when it is released and falls to the turntable and arranged to be moved about its pivot by contact of the cam part with the falling record, a latch, resilient means for moving said latch into locking engagement with the selector to hold it in a predetermined position, said latch having an abutment thereon arranged to be engaged by a part of said lever remote from the cam and spring means on the lever for holding it in locking engagement with the latch and for holding away from the selector, said latch arranged to be released by the lever when the lever is operated by a record and a seat on the selector arranged for interlocking engagement with the latch.

10. An apparatus as described in claim 9, wherein the latch is provided with a cam element disposed in the path of travel of said cyclicly operated mechanism for movement thereby out of engagement with the selector and a second cam means on said latch for engagement with the lever and arranged to move the lever into locking engagement with the latch.

References Cited in the file of this patent

UNITED STATES PATENTS 2,090,746 Compare ---------------- Aug. 24, 1937
2,237,340 Downs ---------------- Apr. 8, 1941
2,563,653 Lingenbrink ------------ Aug. 17, 1951